United States Patent
Kim et al.

(10) Patent No.: US 10,222,486 B2
(45) Date of Patent: Mar. 5, 2019

(54) RADIATION DETECTOR AND RADIOGRAPHIC APPARATUS INCLUDING THE SAME

(71) Applicant: Samsung Electronics Co., Ltd., Suwon-si, Gyeonggi-do (KR)

(72) Inventors: Yongchul Kim, Seoul (KR); Taegon Kim, Hwaseong-si (KR); Sangeui Lee, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 436 days.

(21) Appl. No.: 15/174,029

(22) Filed: Jun. 6, 2016

(65) Prior Publication Data
US 2017/0160405 A1    Jun. 8, 2017

(30) Foreign Application Priority Data

Dec. 8, 2015   (KR) .................. 10-2015-0174152

(51) Int. Cl.
   *C09K 11/61*    (2006.01)
   *G01T 1/20*    (2006.01)

(52) U.S. Cl.
   CPC ............ *G01T 1/2018* (2013.01); *G01T 1/201* (2013.01)

(58) Field of Classification Search
   CPC ........... B22F 9/24; B82Y 15/00; B82Y 20/00; G02B 2207/101
   See application file for complete search history.

(56) References Cited

U.S. PATENT DOCUMENTS

| 5,556,716 A | 9/1996 | Herron et al. |
| 6,784,432 B2 | 8/2004 | Wieczorek |
| 8,044,476 B2 | 10/2011 | Hatanaka et al. |
| 8,754,379 B2 | 6/2014 | Antonuk |
| 2012/0292516 A1* | 11/2012 | Yasui ................... C09K 11/616 250/361 R |

FOREIGN PATENT DOCUMENTS

| JP | 2010-286478 A | 12/2010 |
| KR | 100992314 B1 | 11/2010 |
| KR | 101059486 B1 | 8/2011 |

OTHER PUBLICATIONS

Sergii Yakunin, et al., "Low-threshold amplified spontaneous emission and lasing from colloidal nanocrystals of caesium lead halide perovskites", Nature Communications 6, Article No. 8056, 2015.
Christian KN. Moller, "The Structure of Caesium Plumbo Iodide CsPbl3," Matematisk-fysiske Meddelelser, Det Kongelige Danske Videnskabernes Selskab, 32, No. 1 (1959 ).

(Continued)

*Primary Examiner* — Don Wong
(74) *Attorney, Agent, or Firm* — Harness, Dickey & Pierce, P.L.C.

(57) ABSTRACT

Provided are a radiation detector and a radiographic apparatus including the same. The radiation detector may have high quantum efficiency due to use of a plurality of nano-waveguides that extend from an incident end thereof to an exit end thereof and are configured to generate scintillation as radiation rays penetrate therethrough or a photoconductor.

20 Claims, 13 Drawing Sheets

(56) References Cited

OTHER PUBLICATIONS

Loredana Protesescu et al., "Nanocrystals of Cesium Lead Halide Perovskites (CsPbX3, X=Ci, Br, and I): Novel Optoelectronic Materials Showing Bright Emission with Wide Color Gamut" Nano Letters, 2015, 15 (6), pp. 3692-3696.

Sergii Yakunin, et al., "Detection of X-ray photons by solution-processed lead halide perovskites," Nature Photonics 9, 444-449 (2015).

* cited by examiner

RADIATION DETECTOR AND RADIOGRAPHIC APPARATUS INCLUDING THE SAME

CROSS-REFERENCE TO RELATED APPLICATION

This application claims the benefit of Korean Patent Application No. 10-2015-0174152, filed on Dec. 8, 2015, in the Korean Intellectual Property Office, the disclosure of which is incorporated herein in its entirety by reference.

BACKGROUND

1. Field

Example embodiments relate to a radiation detector and/or a radiographic apparatus including the same. For example, at least some example embodiments relate to a radiation detector with enhanced quantum efficiency due to use of a nano-waveguide and/or a radiographic apparatus including the radiation detector.

2. Description of the Related Art

Radiation-based medical equipment including radiographic apparatuses have been used and developed. Radiographic apparatuses have rapidly changed from analog to digital. In line with this trend, a radiation detector, one of the core components of a digital radiographic apparatus, has been rapidly improved. Digital radiographic technology is largely divided into two methods: an indirect method in which an X-ray is converted into visible light that is further converted into an electric signal to generate an image, and a direct method in which an X-ray signal is directly converted into an electric signal to generate an image.

Examples of the indirect method are a method of using thallium doped cesium (CsI:Tl) as a scintillator in a needle-shaped form (about 5 μm to about 10 μm in diameter) via vapor deposition and a method of using gadolinium oxysulfide ($Gd_2O_2S$) powder via sintering and crystallization. An example of the direct method is a method of using amorphous selenium (a-Se) as a photoconductor via vapor deposition.

The indirect method may result in a relatively lower resolution than the direct method. For example, the indirect method may have a resolution of about 100 μm to about 500 μm depending on modality and is widely utilized in general radiography, chest X-ray radiography, fluoroscopy, angiography, computer tomography (CT), etc. The direct method is mainly utilized in mammography in which micro calcification detection with a resolution of about 50 μm to about 75 μm is needed.

SUMMARY

Provided are a radiation detector with increased resolution and high quantum efficiency and a radiographic apparatus including the radiation detector.

Additional aspects will be set forth in part in the description which follows and, in part, will be apparent from the description, or may be learned by practice of the presented example embodiments.

Some example embodiments relate to a radiation detector.

In some example embodiments, the radiation detector may include a scintillator and a photo detector. The scintillator may be configured to generate scintillation, the scintillator including, a plurality of nano-waveguides extending from an incident end of the scintillator to an exit end of the scintillator, the plurality of nano-waveguides configured to generate the scintillation as radiation rays penetrate therethrough, and a protecting material surrounding each of the plurality of nano-waveguides. The photo detector may be configured to detect the scintillation emitted from the scintillator.

In some example embodiments, the plurality of nano-waveguides are one of a nanowire and a nanorod.

In some example embodiments, the plurality of nano-waveguides each have a shape of one of a cylinder and a square column.

In some example embodiments, the plurality of nano-waveguides each have a diameter of about 100 nanometers (nm) to 1000 nm.

In some example embodiments, the plurality of nano-waveguides each have a length of about 100 micrometers (μm) to about 1000 μm.

In some example embodiments, the plurality of nano-waveguides each include a material having a refractive index of about 2 to about 4 in a visible light range.

In some example embodiments, the plurality of nano-waveguides each include a perovskite including lead (Pb).

In some example embodiments, the perovskite is denoted as $ABX_3$, where A or B is Pb, and X is at least one of iodine (I) and bromine (Br).

In some example embodiments, the plurality of nano-waveguides each include at least one of Lead Iodine ($PbI_2$), Mercury Iodine ($HgI_2$), Lead Oxide (PbO), Cadmium zinc telluride (CdZnTe), and Cadmium telluride (CdTe).

In some example embodiments, the protecting material is water-proof.

In some example embodiments, the protecting material includes one of a polymer having a refractive index less than about 1.99 and a composite of the polymer and a carbon nanotube (CNT).

In some example embodiments, the polymer includes at least one of Polycarbonates (PC), Polymethyl methacrylate (PMMA), Si rubber, Polyethylene terephthalate (PET), epoxy, and acryl.

In some example embodiments, the radiation detector further includes a protecting layer configured to cover the incident end of the scintillator.

In some example embodiments, the protecting layer includes a polymer with a refractive index less than about 1.99 or glass.

In some example embodiments, the radiation rays are X-rays.

Some example embodiments relate to a radiation detector.

In some example embodiments, the radiation detector includes a photoconductor and a photo detector. The photoconductor may be configured to perform photo-electric conversion to convert radiation rays into an electric charge, the photoconductor including, a plurality of nano-waveguides extending from an incident end of the photoconductor to an exit end of the photoconductor, the plurality of nano-waveguides configured to guide the radiation rays, and a protecting material surrounding each of the plurality of nano-waveguides. The photo detector may be configured to detect the electric charge generated via the photo-electric conversion in the photoconductor.

In some example embodiments, the radiation detector may further include a protecting layer configured to cover the incident end of the photoconductor.

In some example embodiments, the radiation detector the protecting layer includes a metal thin film.

In some example embodiments, the protecting layer further includes a composite layer of polymer and carbon nanotube (CNT) on the metal thin film.

Some example embodiments relate to a radiography apparatus.

In some example embodiments, the radiography apparatus may include an irradiator configured to emit radiation therefrom; a radiation detector configured to detect the radiation emitted from the irradiator, and a controller configured to control the irradiator and the radiation detector. The radiation detector may include a scintillator configured to generate scintillation, the scintillator including a plurality of nano-waveguides and a protecting material surrounding each of the plurality of nano-waveguides, the plurality of nano-waveguides extending from an incident end of the scintillator to an exit end of the scintillator, the plurality of nano-waveguides configured to generate the scintillation as radiation rays penetrate therethrough, and a photo detector configured to detect the scintillation emitted from the scintillator; and The radiation detector may be a flat-plate detector. In other words, the scintillator may be a flat-plate scintillation panel, and the photo detector may be arranged on a back surface (that is, an exit surface) of the scintillation panel and may be equipped with a plurality of pixel sensors in a two-dimensional array. In various example embodiments, high quantum efficiency may be obtained by using a nano-waveguide such as a nanowire and a nanorod in a radiation detector.

In various example embodiments, in an indirect method, high scintillation quantum efficiency and high resolution due to a photo-restriction effect of a nano-structure may be obtained by using perovskite including lead or a material with a high refractive index such as PbI2, HgI2, PbO, CdZnTe, and CdTe in the scintillator, in comparison with Gd2O2S or CsI. In addition, in a direct method, high sensitivity of the material itself, in comparison with conventional a-Se, and a restriction effect of generated electric charges in a nano-structure may be expected in a radiation detector using the material above as a photoconductor such as a nanowire or a nanorod.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1:
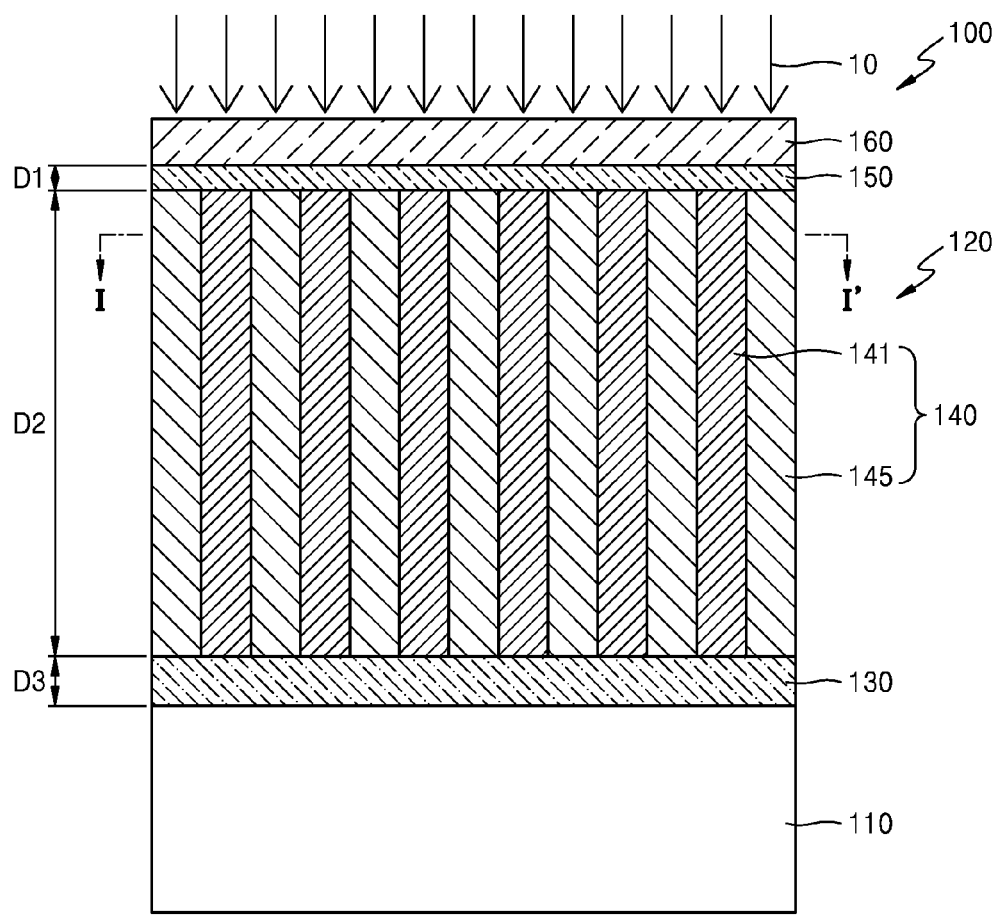
FIG. 1 is a schematic side cross-sectional view of a radiation detector according to an example embodiment.

Reference will now be made in detail to example embodiments, examples of which are illustrated in the accompanying drawings. In this regard, the present embodiments may have different forms and should not be construed as being limited to the descriptions set forth herein. Accordingly, the example embodiments are merely described below, by referring to the figures, to explain aspects thereof. Expressions such as "at least one of," when preceding a list of elements, modify the entire list of elements and do not modify the individual elements of the list.

A detailed description is provided below with reference to the appended drawings showing a radiation detector and a radiographic apparatus including the same. Like reference numerals refer to like elements throughout the drawings Sizes of elements in the drawings may be exaggerated for convenience of explanation. In other words, since sizes and thicknesses of the components in the drawings are arbitrarily illustrated for convenience of explanation, the following embodiments are not limited thereto. In addition, it will be understood that when a component, such as a layer, a film, a region, or a plate, is referred to as being "on" another component, the component can be directly on the other component or intervening components may be present thereon. In addition, since materials composing respective layers in the example embodiments below are examples only, other materials may be used also. Throughout the specification, the singular forms "a," "an", and "the" are intended to include the plural forms as well, unless the context clearly indicates otherwise.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

While example embodiments of the inventive concepts will be particularly shown and described with reference to some example embodiments thereof, it will be understood by those of ordinary skill in the art that various changes in form and details may be made therein without departing from the spirit and scope of the inventive concepts as defined by the appended claims. The example embodiments should be considered in a descriptive sense only and not for purposes of limitation.

Therefore, the scope of the example embodiments of the inventive concepts are defined not by the detailed description of the example embodiments of the inventive concepts but by the appended claims, and all differences within the scope will be construed as being included in the example embodiments of the inventive concepts.

For example, a radiation ray in the example embodiments of the inventive concepts may be an ultrasonic wave, an alpha ray, a beta ray, a gamma ray, an X-ray, a neutron ray, etc. However, the radiation ray may generally mean an X-ray which generates a transition phenomenon and harms a human body. An X-ray may be used as an example for ease of explanation of the example embodiments of the inventive concepts, but it will be understood by those of ordinary skill in the art that radiation rays the example embodiments of the inventive concepts may refer to other rays.

Figure 2:
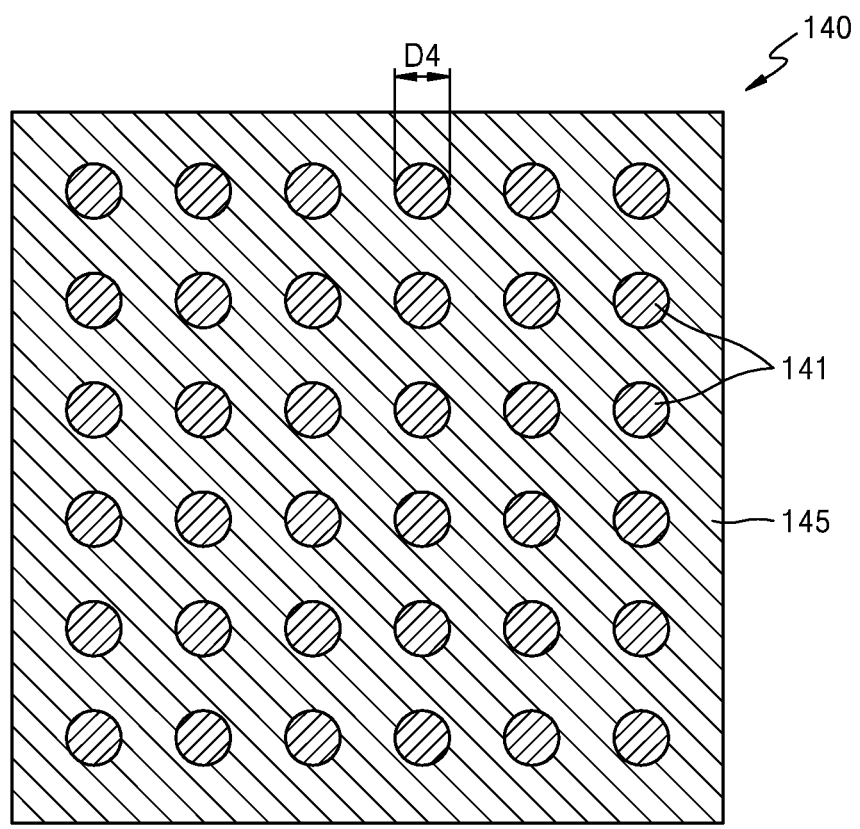
FIG. 2 is a cross-sectional view of the radiation detector of FIG. 1, cut along a line I-I"
Figure 3:
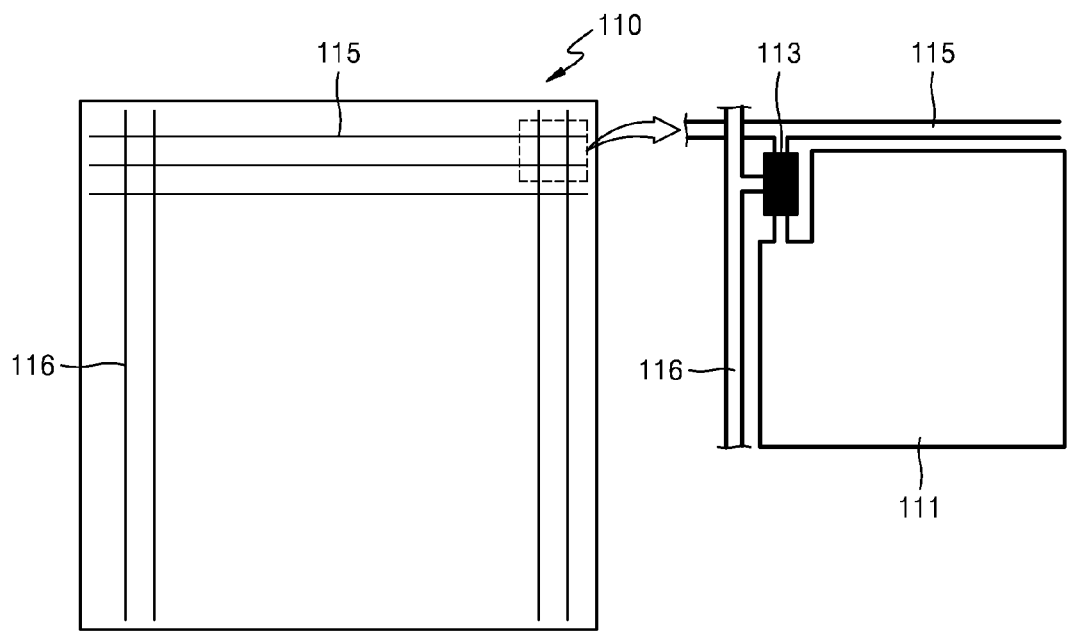
FIG. 3 is a pixel circuit of a photo detector of the radiation detector of FIG. 1 according to an example embodiment.

FIG. 1 is a schematic side cross-sectional view of a radiation detector according to an example embodiment, FIG. 2 is a cross-sectional view of the radiation detector of FIG. 1, cut along a line I-I", and FIG. 3 is a pixel circuit of a photo detector of the radiation detector of FIG. 1 according to an example embodiment.

Referring to FIGS. 1 through 3, a radiation detector 100 may include a scintillator 120 and a photo detector 110. A reference numeral 130 denotes a combining layer combining the scintillator 120 and the photo detector 110.

The scintillator 120 may include a scintillation layer 140 and a transparent material layer 160.

The scintillation layer 140 may include a plurality of nano-waveguides 141 and a protecting material 145.

Each of the nano-waveguides 141 may extend from an incident end thereof to an exit end thereof. The plurality of nano-waveguides 141 may be arranged in a two-dimensional array. The scintillation layer 140 may have a two-dimensional flat-plate structure. The incident end of each of the nano-waveguides 141 may be exposed to an incident surface of the scintillation layer 140, and the exit end of each of the nano-waveguides 141 may be exposed to an exit surface of the scintillation layer 140.

Each of the nano-waveguides 141 may be a nanowire or a nanorod and have a cylindrical shape with a length $D2$ of about 100 1 μm to about 1000 μm. A diameter ($D4$ in FIG.

2) of each of the nano-waveguides 141 may be, for example, about 10 nm to about 1000 nm.

Each of the nano-waveguides 141 may include a scintillation material that generates scintillation as radiation rays 10 penetrate therethrough. The radiation rays may be X-rays. Each of the nano-waveguides 141 may include a material with a refractive index of about 2 to about 4 in a visible light range. For example, each of the nano-waveguides 141 may include mixed cation perovskite capable of a solution process and including lead (Pb), for example, CsPbI3.

When the perovskite is denoted as ABX3, A or B is Pb, and X may be at least one of iodine (I) and bromine (Br). For example, the nano-waveguide 141 may include a material like CH3NH3PbI3-xBrx, CsPbI3-xBrx ($0 \leq x \leq 3$). Alternatively, the nano-waveguide 141 may include at least one material selected from Lead Iodine (PbI2), Mercury Iodine (HgI2), Lead Oxiode (PbO), Cadmium zinc telluride (CdZnTe), and Cadmium telluride (CdTe).

As described below with reference to FIG. 8, the mixed cation perovskite may have high quantum efficiency in all range of energy band used for X-ray medical images, in comparison with a-Se/CsI. In addition, since the mixed cation perovskite may have a high visible light refractive index of about 3.0 to about 3.5, when each of the nano-waveguides 141 includes the mixed cation perovskite, each of the nano-waveguides 141 may act as a waveguide with high gain due to the high visible light refractive index thereof. Accordingly, by utilizing the mixed cation perovskite as a material for each of the nano-waveguides 141, the X-ray detector 100 using the indirect method may be manufactured so that high detection quantum efficiency may be obtained with an X-ray amount less than that that needed for the CsI material in a scintillator having same thickness.

The protecting material 145 may be a material protecting each of the nano-waveguides 141 and may surround each of the nano-waveguides 141. The protecting material 145 may be a water-proof protecting material preventing ambient humidity from infiltrating each of the nano-waveguides 141. The protecting material 145 may include a polymer with a refractive index less than about 1.99 or a composite of a polymer and carbon nanotube (CNT). For example, the polymer may include at least one material selected from Polycarbonates (PC), Polymethyl methacrylate (PMMA), Si rubber, Polyethylene terephthalate (PET), epoxy, and acryl.

The transparent material layer 160 may cover an incident end of the scintillator (that is, an incident surface of the scintillation layer 140.) The transparent material layer 160 may include a polymer with a refractive index less than about 1.99 or glass and protect the scintillation layer 140.

A reflecting layer 150 reflecting scintillation generated in the scintillation layer 140 and traveling toward the incident end (refer to 13b in FIG. 4) may be further arranged between the scintillation layer 140 and the transparent material layer 160. The reflecting layer 150 may be, for example, a metal thin film such as Al and Au. The reflecting layer 150 may have a thickness D1 of, for example, about 0.1 μm to about 5 μm.

The photo detector 110 may detect visible light converted in the scintillator 120. The radiation detector 100 may be a flat-plate detector. In other words, the scintillator 120 may be a flat-plate type scintillation panel, and the photo detector 110 may be arranged on a back surface (that is, an exit surface) of the scintillator 120 (panel) and be equipped with a plurality of pixel sensors arranged in a two-dimensional array as illustrated in FIG. 3.

Referring to FIG. 3, the photo detector 110 may include electric lines 115 and 116 arranged in a two-dimensional array, a photo diode 111 arranged at respective crossing points of the electric lines 115 and 116, and a pixel circuit 113.

The photo diode 111 may receive visible light converted in the scintillator 120 and convert the visible light into an electric signal. The photo diode 111 may be a photo-electric conversion element and may include a photo transistor, etc. The electric signal converted in the photo diode 111 may pass through the pixel circuit 113 and be converted into a digital signal containing image information in a reading circuit unit (not illustrated.) The digital signal may be signal-processed in a signal processing unit (552 in FIG. 12) and converted into a radiation image signal.

Figure 4:
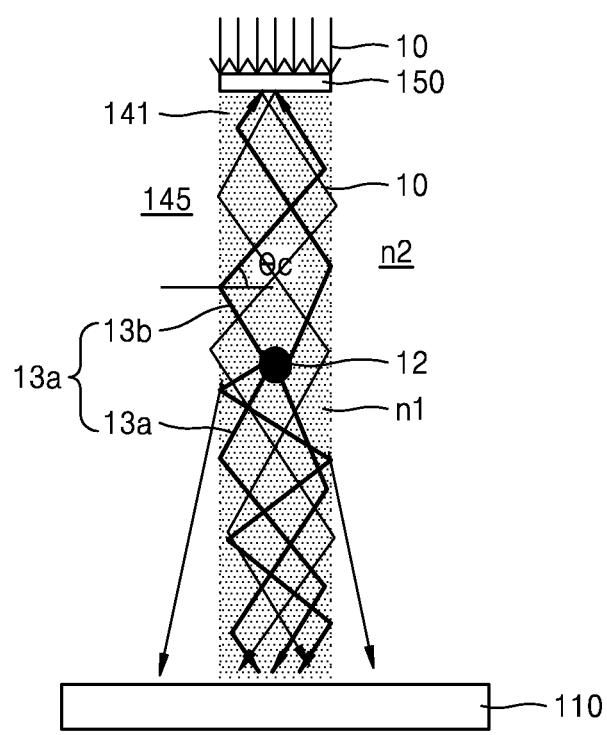
FIG. 4 is a drawing illustrating an operation of the radiation detector of FIG. 1 according to an example embodiment.

FIG. 4 is a drawing illustrating an operation of the radiation detector 100 of FIG. 1 according to an example embodiment.

Referring to FIG. 4, during operation of the operation of the radiation detector 100, the radiation ray 10 input toward the incident end of the nano-waveguide 141 may collide with a fluorescent substance 12 inside the nano-waveguide 141 and generate a scintillation phenomenon. The reflecting layer 150 may include a thin film so that the radiation ray 10 having a high energy may sufficiently penetrate therethrough.

During the scintillation phenomenon, the radiation ray 10 may be converted into visible light 13. The visible light 13 may travel in an arbitrary direction. In other words, a portion of scintillation 13a of the visible light 13 may travel toward the exit end of the nano-waveguide 141 and a portion of scintillation 13b of the visible light 13 may travel toward the incident end of the nano-waveguide 141. The scintillation 13b traveling toward the incident end of the nano-waveguide 141 may be reflected at the reflecting layer 150 and return back. The reflecting layer 150 may have a thickness so that the scintillation 13b having a low energy may be reflected thereby. On the other hand, each of the nano-waveguides 141 may be surrounded by the protecting material 145. Since a refractive index n1 of each of the nano-waveguide 141 may be greater than a refractive index n2 of the protecting material 145, the visible light 13 hitting the protecting material 145 at an incident angle larger than a total reflection angle $\theta_C$ inside the nano-waveguide 141 may be confined inside the nano-waveguide 141 due to total reflection. Accordingly, the visible light 13 may travel toward the photo detector 100 due to light guidance of the nano-waveguide 141.

Each of the nano-waveguides 141 is illustrated as having a cylindrical shape in FIG. 2. However, example embodiments are not limited thereto.

Figure 5:
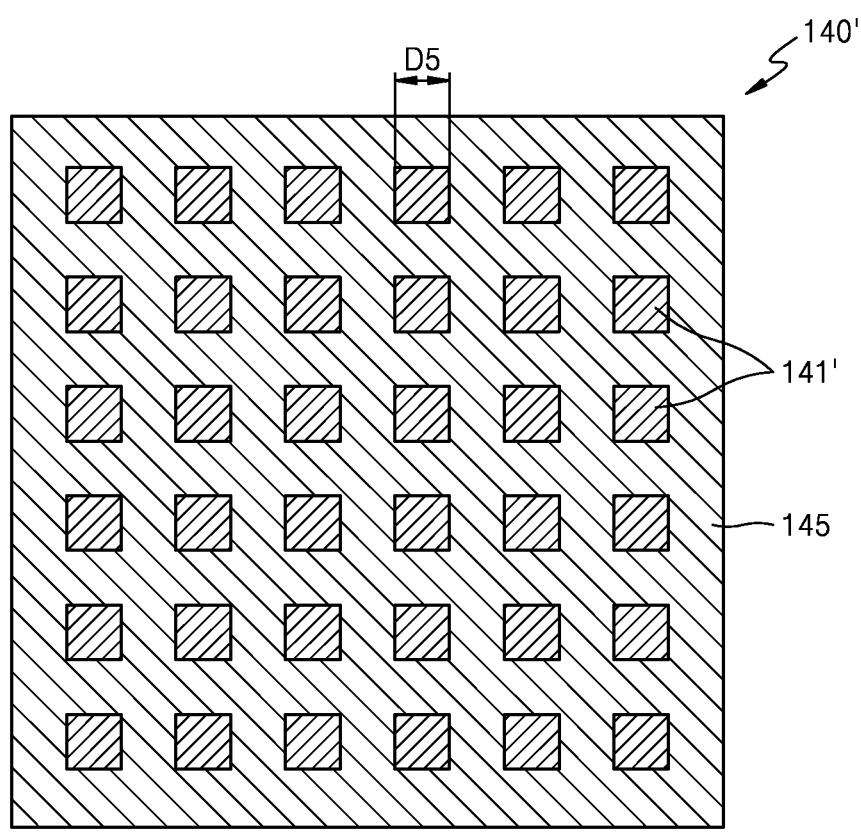
FIG. 5 is a cross-sectional view of a scintillation layer having a different example nano-waveguide in the radiation detector of FIG. 1 according to an example embodiment.

FIG. 5 is a cross-sectional view of a scintillation layer 140" having a different nano-waveguide 141" in the radiation detector of FIG. 1. As illustrated in FIG. 5, the nano-waveguide 141" may have a square column shape with a side length D5 of about 10 nm to 1000 nm.

Figure 6:
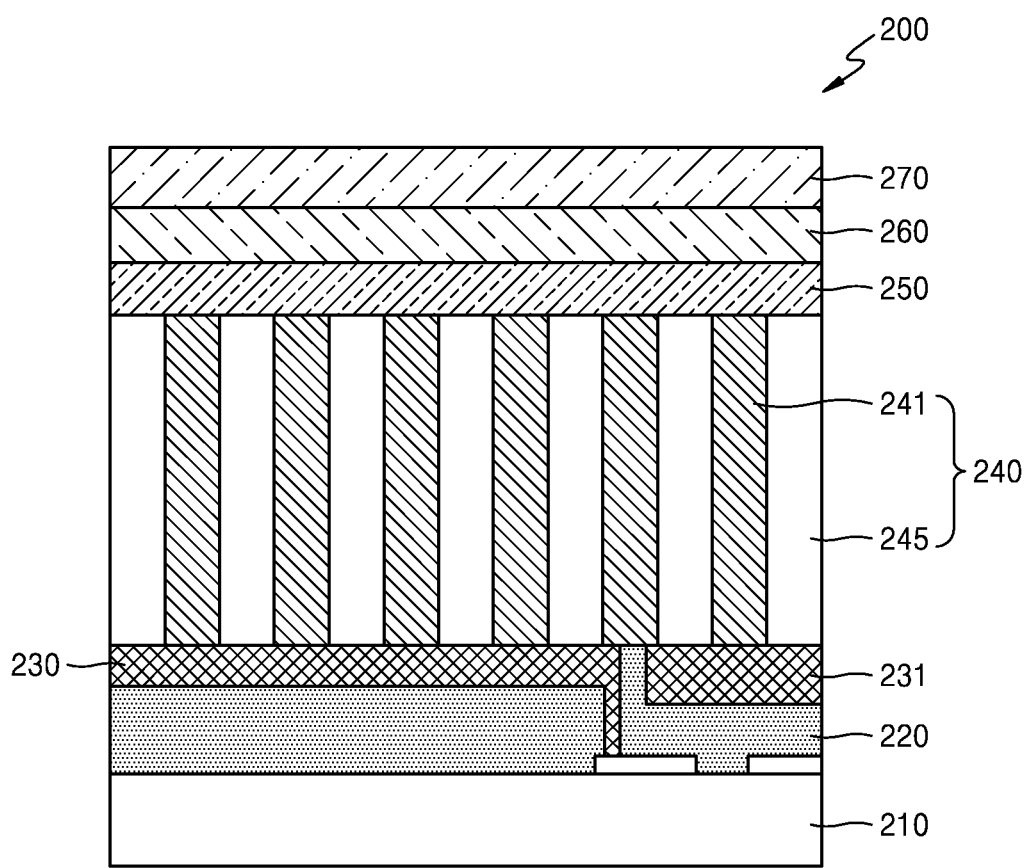
FIG. 6 is a schematic side cross-sectional view of a radiation detector according to an example embodiment.
Figure 7:
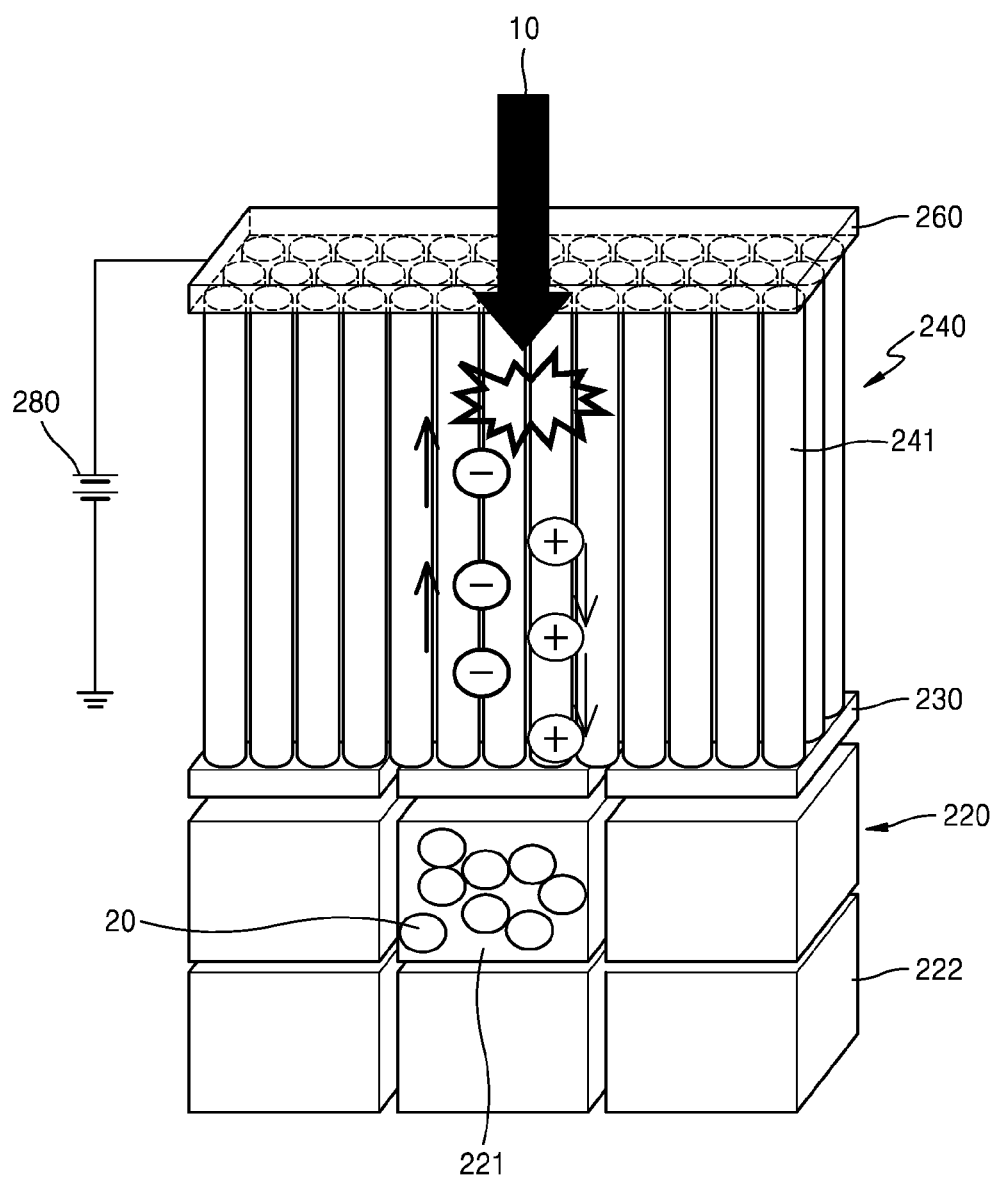
FIG. 7 is a drawing illustrating an operation of the radiation detector of FIG. 6 according to an example embodiment.

FIG. 6 is a schematic side cross-sectional view of a radiation detector according to an example embodiment, and FIG. 7 is a drawing illustrating an operation of the radiation detector of FIG. 6 according to an embodiment.

Referring to FIGS. 6 and 7, a radiation detector 200 may include a photoconductor unit and a detection unit 220.

The photoconductor unit may include a photoconductor layer 240, a top electrode layer 260, and a transparent material layer 270.

The photoconductor layer 240 may include a plurality of nano-waveguides 241 and a protecting material 245.

Each of the nano-waveguides 241 may extend from an incident end thereof to an exit end thereof. The plurality of nano-waveguides 241 may be arranged in a two-dimensional array. The photoconductor layer 240 may have a two-dimensional flat-plate structure. The incident end of each of the nano-waveguides 241 may be exposed to an incident surface of the photoconductor layer 240, and the exit end of each of the nano-waveguides 241 may be exposed to an exit surface of the photoconductor layer 240.

Each of the nano-waveguides 241 may be a nanowire or a nanorod and may have a shape of a cylinder or a square column. Each of the nano-waveguide 241 may have a diameter of, for example, about 10 nm to about 1000 nm and a length of about 100 μm to about 1000 μm.

Each of the nano-waveguides 241 may include a photoconducting material that photo-electrically converts radiation rays 10 that penetrate therethrough. The radiation rays 10 may be X-rays. Each of the nano-waveguides 241 may include a material with a refractive index of about 2 to about 4 in a visible light range. For example, each of the nano-waveguides 241 may include mixed cation perovskite capable of a solution process and including lead (Pb) like CsPbI3.

When the perovskite is denoted as ABX3, A or B is Pb, and X may be at least one of iodine (I) and bromine (Br). For example, each of the nano-waveguides 241 may include a material like CH3NH3PbI3-xBrx, CsPbI3-xBrx (0≤x≤3). Alternatively, according to another example embodiment, each of the nano-waveguides 241 may include at least one material selected from PbI2, HgI2, PbO, CdZnTe, and CdTe.

As described in the example embodiments above, the mixed cation perovskite may have high quantum efficiency in all range of energy bands used for X-ray medical images, in comparison with a-Se/CsI. In addition, since the mixed cation perovskite may have a high visible light refractive index of about 3.0 to about 3.5, when each of the nano-waveguides 241 includes mixed cation perovskite, each of the nano-waveguides 241 may act as a waveguide with high gain due to the high visible light refractive index thereof. In addition, since the mixed cation perovskite may have a low trap density, and a lateral drift of electric charges generated due to a hole trap may be limited, a high carrier mobility may be obtained. For example, an electron/hole mobility of CsPbI3 may be 5/20 [cm2/(V·s)] which is much larger than that of a-Se, that is, 0.003/0.14 [cm2/(V·s)]. Thus, when each of the nano-waveguides 241 includes a material like the mixed cation perovskite and has the characteristics thereof, an effective separation of electric charges is expected to be feasible in an electric field with an intensity significantly lower than that of an applied electric field intensity (20 V/um) of a conventional X-ray detector using the a-Se. Accordingly, a direct method-based X-ray detector including the plurality of nano-waveguides 241 comprising the mixed cation perovskite is expected to have an excellent detection quantum efficiency for high energy images including mammography.

The protecting material 245 may be a material protecting the each of the nano-waveguides 241 and may surround each of the nano-waveguides 241. The protecting material may be a water-proof protecting material preventing ambient humidity from infiltrating the plurality of nano-waveguides 241. The protecting material 245 may include a polymer with the refractive index less than about 1.99 or a composite of the polymer and carbon nanotube (CNT). For example, the polymer may include at least one material selected from PC, PMMA, Si rubber, PET, epoxy, and acryl.

The top electrode layer 260 may be configured to cover an incident end of the photoconductor unit (that is, the incident surface of the photoconductor layer 240). The top electrode layer 260 may be a metal thin film. For example, the metal thin film may include Al and Au.

A protecting layer 250 may be further arranged between the photoconductor layer 240 and the top electrode layer 260. The protecting layer 250 may include, for example, a composite of a polymer and CNT.

A pixel electrode 230 may be arranged at the bottom of the photoconductor layer 240. Also, a shield electrode 231 may be arranged at a portion of the bottom of the photoconductor layer 240, and circuit elements of a detection unit 220 may be arranged beneath the shield electrode 231.

The detection unit 220 may detect electric charges generated in the photoconductor layer 240. The radiation detector 200 may be a flat-plate type detector. In other words, the photoconductor unit may be a flat-plate type panel, and the detection unit 220 may be arranged on a back surface (that is, an exit surface) of the photoconductor unit (panel) and be equipped with a plurality of pixel sensors arranged in a two-dimensional array.

Referring to FIG. 7, the detection unit 220 may include a storage capacitor 221 and a reading circuit 222 reading electric charges collected in the storage capacitor 221.

A power source 280 may be connected to the top electrode layer 260 and a voltage may be applied to the top electrode layer 260 at one end of the photoconductor layer 240. Another end of the power source 280 may be grounded. Accordingly, an electric field may be applied inside the nano-waveguide 241. When the radiation ray 10 is incident on the photoconductor layer 240, the radiation ray 10 may be converted into electrons and holes due to a material of the nano-waveguide 241. Converted electrons and holes may be respectively drawn to the top electrode layer 260 and the pixel electrode 230 due to the electric field.

The pixel electrode 230 may collect electric charges 20 generated via photo conversion of the radiation ray 10, and the storage capacitor 222 connected to the pixel electrode 230 may collect electric charges 20. The reading circuit 222 may convert a charge amount of the storage capacitor 221 into a digital signal. The digital signal may be signal-processed in the signal processing unit (552 in FIG. 12) and converted into a radiation image signal.

Figure 8:
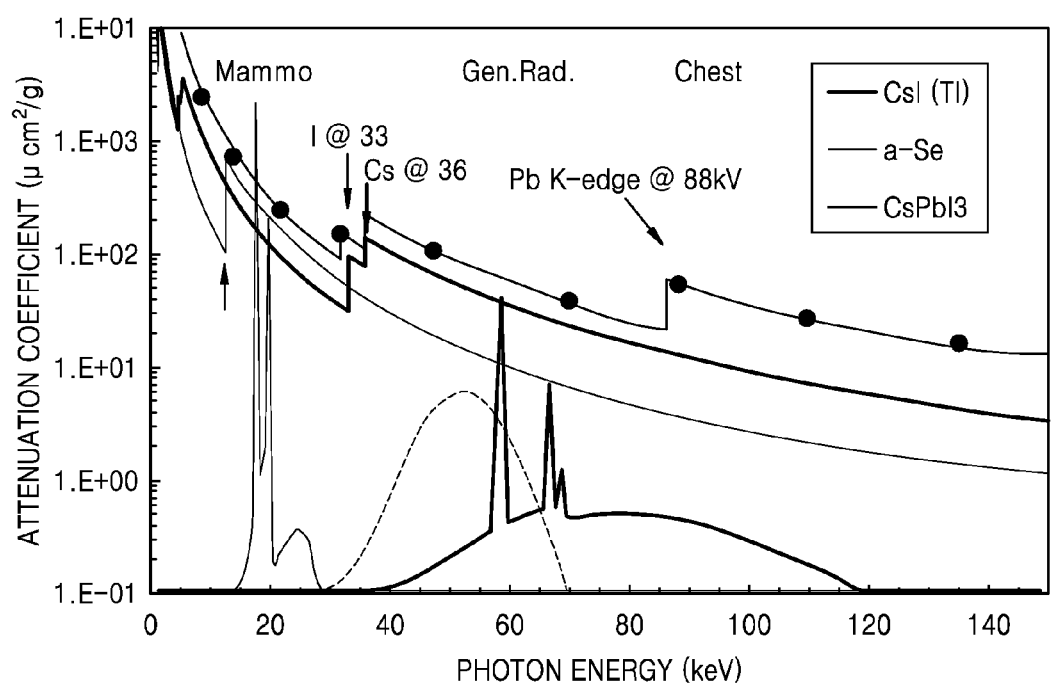
FIG. 8 is a graph illustrating an attenuation coefficient of Pb perovskite and a comparing material with respect to X-ray energy according to an example embodiment.

FIG. 8 is a graph illustrating an attenuation coefficient of Pb perovskite and a comparing material with respect to X-ray energy.

Referring to FIG. 8, CsPbI3, shows a higher attenuation coefficient for all ranges of photon energy in comparison with a-Se or CsI. For example, CsPbI3 may have an X-ray absorption rate about 4 times to about 5 times higher than that of a-Se at about 30 kVp or more. For a photon energy band of about 30 keV to about 40 keV, a-Se is generally used in a conventional mammography. However, CsPbI3 shows a higher attenuation coefficient than a-Se. Thus, radiation images of a higher quality than in a conventional a-Se case may be obtained using CsPbI3 in the radiation detector when a low X-ray energy source of about 30 kVp to about 40 kVp is used, like in the case of mammography. In addition, for a photon energy band of 40 keV or more, conventional general radiography, chest X-ray radiography, fluoroscopy, angiography, etc. mainly use CsI. However, CsPbI3 shows a higher attenuation coefficient than CsI. A higher attenuation coefficient denotes better and more absorption of the radiation ray (the X-ray). Thus, CsPbI3 may show detective quantum efficiency (DQE) of final images better than in the case of a CsI material with same thickness.

Figure 9:
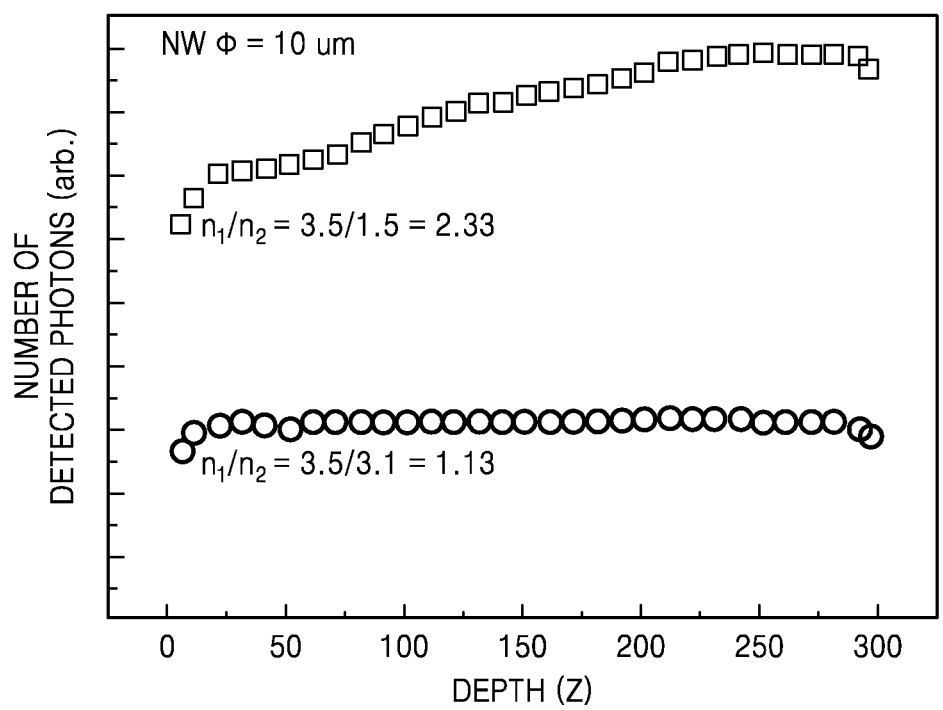
FIG. 9 is a graph illustrating numbers of detected photons when ratios of refractive indices of the nano-waveguide and the protecting material are different from each other according to an example embodiment.
Figure 10:
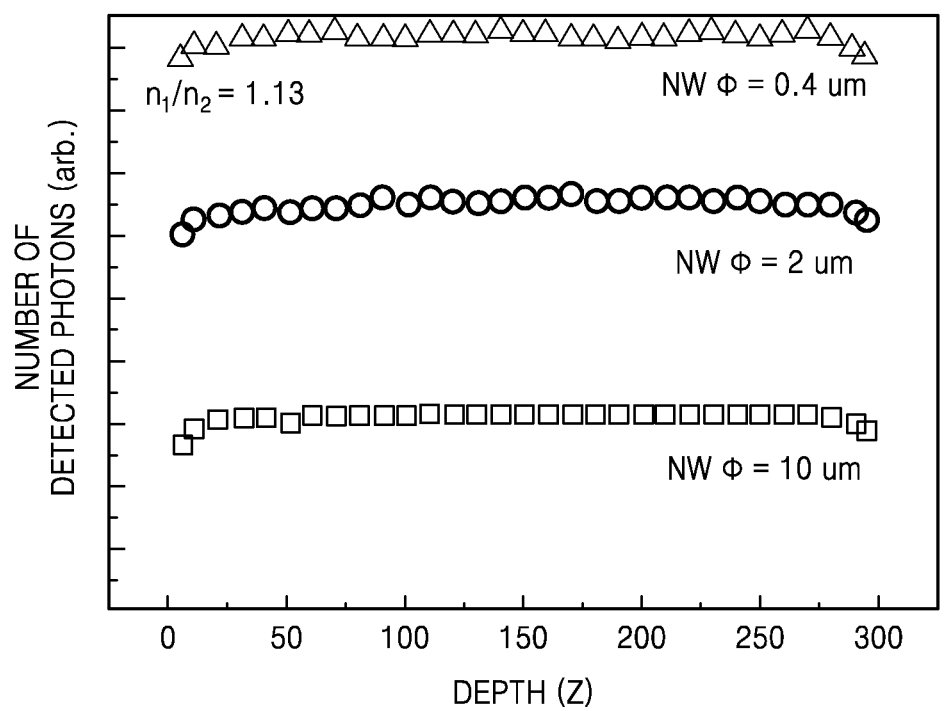
FIG. 10 is a graph illustrating numbers of detected photons when diameters of nano-waveguides are different from one another according to an example embodiment.

FIG. 9 is a graph illustrating the number of detected photons when ratios of refractive indices of the nano-waveguide and the protecting material (clad) are different from each other, and FIG. 10 is a graph illustrating the number of detected photons when diameters of nano-waveguides are different from one another.

Graphs of FIGS. 9 and 10 are simulation results obtained by using the Monte-Carlo method. In FIGS. 9 and 10, n1 denotes a refractive index of each of the nano-waveguide 141 and n2 denotes a refractive index of the protecting material 145 surrounding each of the nano-waveguide 141. The number of visible light photons generated by the X-ray was fixed at 10,000 per pixel (100 μm×100 μm) in all simulations.

Referring to FIG. 9, the nano-waveguide 141 is a nanowire having a diameter φ of about 10 μm and a length of about 300 μm. The nano-waveguide 141 is formed of CsPbI3 and has a refractive index of about 3.5. Meanwhile, the protecting material 145 (clad) includes polymethyl methacrylate (PMMA) and has a refractive index of about 1.5. Accordingly, when the scintillation panel (or the photoconductor panel) includes a CsPbI3 nano-waveguide and a PMMA protecting material, a ratio of n1/n2 is about 2.23. Alternatively, when the protecting material has a refractive index as large as about 3.1, the ratio of n1/n2 is about 1.13. The number of detected photons when the ratio of n1/n2 is about 2.33 is larger than in the case when the ratio of n1/n2 is about 1.13. In other words, the photo guidance effect becomes better as the ratio of n1/n2 becomes larger because, when the ratio of n1/n2 is about 1.13, there is a little difference between the refractive indices of the nano-waveguide 141 and the protecting material 145 surrounding the nano-waveguide 141, and thus, a role of the nano-waveguide 141 as a Fabry-Perot waveguide is limited. However, when the ratio of n1/n2 is about 2.33, photons are sufficiently confined inside the nano-waveguide 141 due to the difference in the refractive indices.

In the case of a conventional scintillation panel, needle-shaped CsI:Tl with a diameter of about 5 μm to about 10 μm may be prepared and used, or a Si wafer may be dry-etched and holes with a diameter of about 50 μm to about 100 μm may be drilled therein to prepare CsI and to block a photo path, for the purpose of reducing Swank noise generated by visible light which is converted by an X-ray absorption and infiltrates neighboring pixels. However, in the case of CsI material, since the refractive index is merely about 1.8 and is not significantly different from that of circumjacent waterproof protecting polymer (PMMA, etc.), that is, about 1.5 to about 1.6, even a needle-shape structure may not sufficiently confine generated photons inside the needle-shape structure. In addition, in the case of Si cladding, since the refractive index of Si is about 3.5, which is larger than that of CsI, there is a high possibility that a waveguide structure of CsI may result in a photon loss, and thus, even though Swank noise may be reduced, a large gain may not be obtained and a loss in photon efficiency may occur.

In the example embodiments described above, the nano-waveguides 141 and 241 may include a material such as Pb-included perovskite, PbI2, HgI2, PbO, CdZnTe, and CdTe, and these materials may have refractive indices of about 2 to about 4 in the visible light range. In addition, the protecting material 145 and 245 may include a polymer with a refractive index less than about 1.99 or a composite of polymer/CNT. Accordingly, in the radiation detector in the example embodiments described above, the nano-waveguides 141 and 241 may sufficiently confine emitted photons and obtain high quantum efficiency while acting as a Fabry-Perot waveguide.

Referring to FIG. 10, the ratio of n1/n2 is about 1.13 and a length of the nano-waveguide is about 300 μm. In comparison with the nano-waveguide having a diameter φ of about 10 μm, the nano-waveguide 141 having a diameter φ of about 2 μm shows increased number of photons, and the nano-waveguide 141 having a diameter φ of about 0.4 μm shows further increased number of photons. In other words, FIG. 10 illustrates that the photon guide effect of the nano-waveguide 141 becomes better as the diameter φ of the nano-waveguide 141 becomes smaller.

The nano-waveguides 141 and 241 may have a diameter of about 10 nm to about 1000 nm in example embodiments described above, while conventional needle-structured CsI:Tl may be configured to have a diameter of about 5 μm to 10 μm or waveguide-structured CsI formed in an etching method may have a diameter of about 50 μm to 100 μm. As shown in FIG. 10, the radiation detector in the example embodiments described above may further enhance a confinement efficiency of photons and obtain higher quantum efficiency by having using the nano-waveguides 141 and 241 with sufficiently small diameters.

Table 1 below shows calculated values of quantum efficiency of perovskite and comparing materials.

TABLE 1

|  | CsI (600 μm) | a-Se (1000 μm) | CsPbI$_3$ (600 μm) |
| --- | --- | --- | --- |
| 70 kV | 75 | 64 | 82 |
| 120 kVp | 52 | 35 | 80 |

Referring to Table 1, at an applied voltage of 70 kVp, CsPbI$_3$ with a length of 600 μm shows larger quantum efficiency, in comparison with CsI with a length of 600 μm or a-Se with a length of 1000 μm, and when the applied voltage is increased to 120 kVp, CsPbI$_3$ with a length of 600 μm shows a much larger value in comparison with other materials.

FIGS. 11A through 11E are drawings illustrating a method of manufacturing a nano-waveguide 330 according to an example embodiment.

Figure 11A:
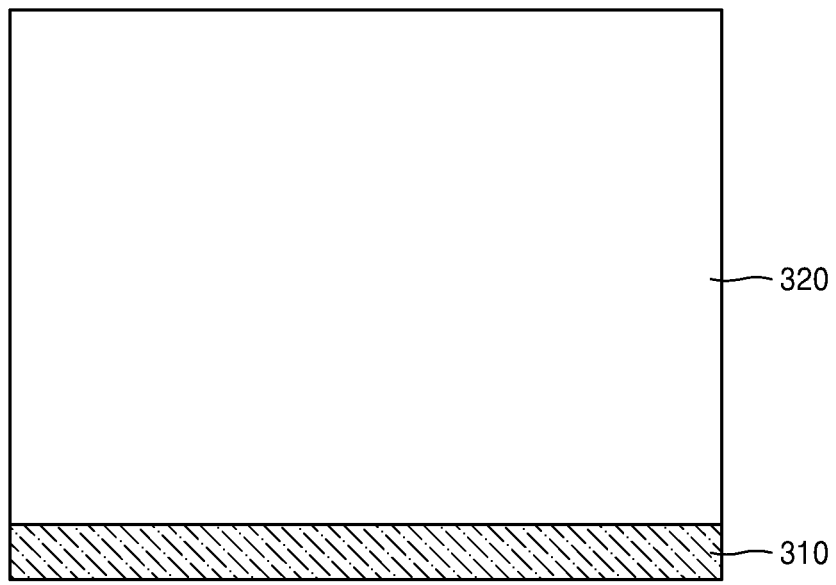
FIGS. 11A through 11E are drawings illustrating a method of manufacturing a nano-waveguide according to an example embodiment.

Referring to FIG. 11A, a template thin film 320 may be formed on a substrate 310. The substrate 310 may be, for example, a silicon substrate, and the top surface thereof may be a (100) surface including a nano-waveguide (nanowire) with excellent vertical alignment. The template thin film 320 may include materials such as aluminum and titanium.

Figure 11B:
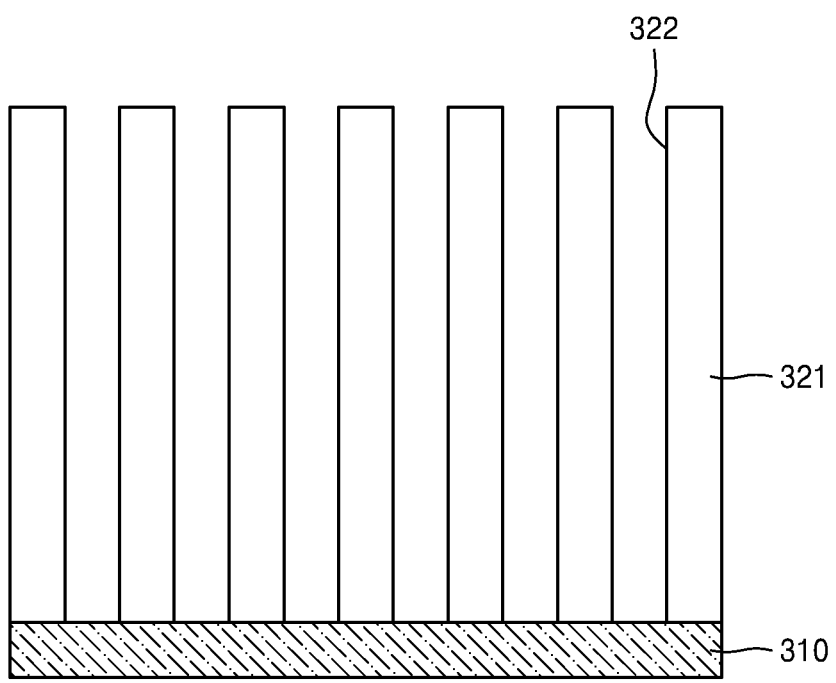

Next, referring to FIG. 11B, the thin film 320 may be anodized. For example, when a current is applied to the substrate 310 on which the thin film 320 is formed, the substrate 310 acts as an anode in a reactor equipped with an acidic electrolyte, the thin film 320 may be oxidized by oxygen generated at the anode and a thin anode oxide film may be formed on a surface of the template thin film 320. When a sufficient voltage is applied to the anode oxide film formed as such, the electrolyte may cause erosion and erode the anode oxide film. Since heat generated in accordance with erosion may further accelerate the erosion of the electrolyte, openings 322 may be formed in a direction toward the substrate 310. At the same time, oxygen generated at the anode may continuously oxidize the thin film 320 and change the thin film 320 into an anode oxide film 321. In other words, the anode oxide film 321 in which the openings 322 extend from a top surface of the template thin film 320 to a bottom surface thereof (that is, a surface in contact with the substrate 310) is formed. According to an example embodiment, when the thin film 320 includes aluminum, the anode oxide film 321 may be an aluminum oxide thin film.

Figure 11C:
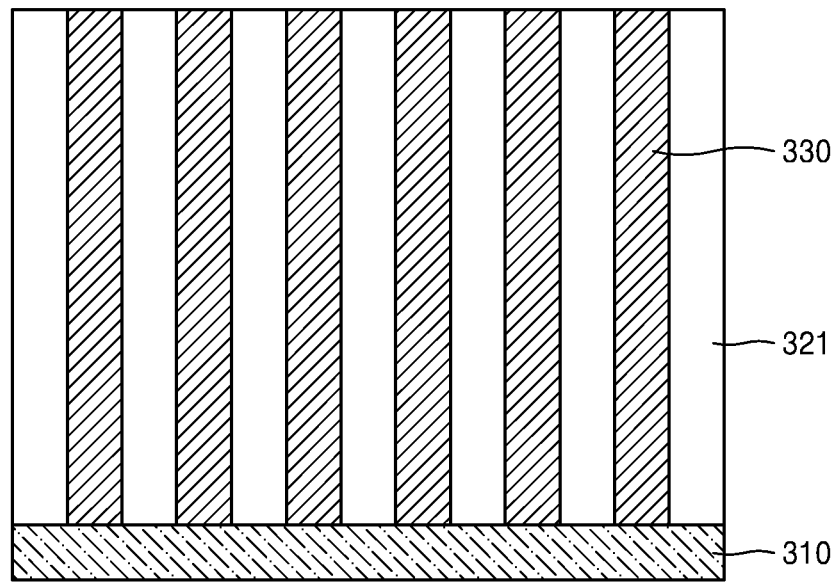

Next, referring to FIG. 11C, a plurality of nano-waveguides 330 may be grown inside the openings 322 of the anode oxide film 321. By using methods such as immersion in a reaction solution, bar coating, and hydrothermal synthesis, each of the nano-waveguides 330 may include, for example, the mixed cation perovskite capable of a solution process and including lead (Pb) like $CH_3NH_3PbI_{3-x}Br_x$, $CsPbI_{3-x}Br_x$ ($0 \le x \le 3$). Alternatively, each of the nano-waveguides 330 may include at least one material selected from $PbI_2$, $HgI_2$, $PbO$, $CdZnTe$, and $CdTe$. The plurality of nano-waveguides 330 may be formed via a vapor-liquid-solid (VLS) growth method based on heterogeneous catalytic seeds. Before growing the plurality of nano-waveguides 330, a metal catalyst (not illustrated) may be prepared and grown on the substrate 310 exposed by the openings 322, or on a glass or a silicon substrate without a template.

Figure 11D:
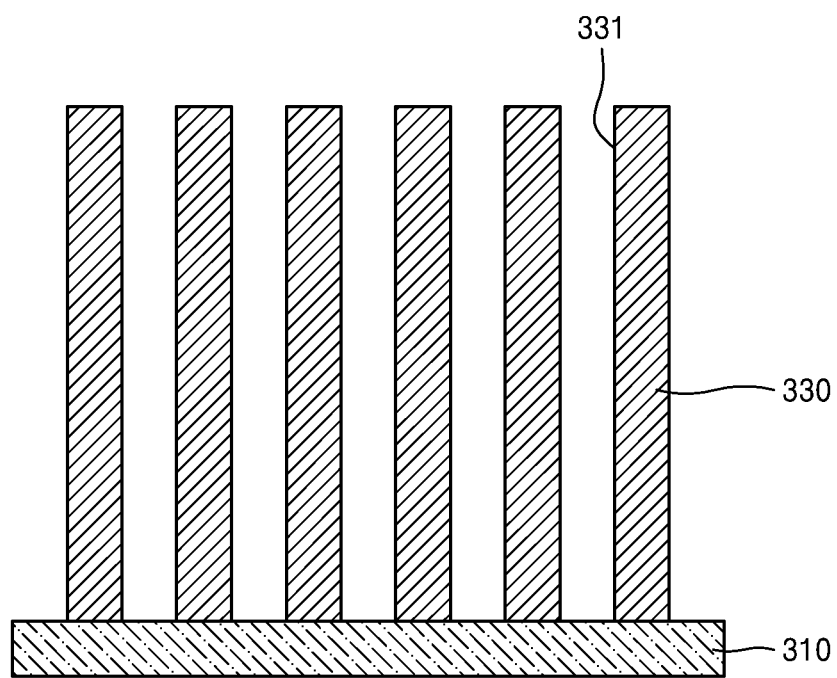

Next, referring to FIG. 11D, the anode oxide film 321 may be removed. As a result, the plurality of nano-waveguides 330 may be arranged in a two-dimensional array in a state of being vertically erected on the substrate 310. The plurality of nano-waveguides 330 may be separated from each other with certain spaces 331 therebetween.

Figure 11E:
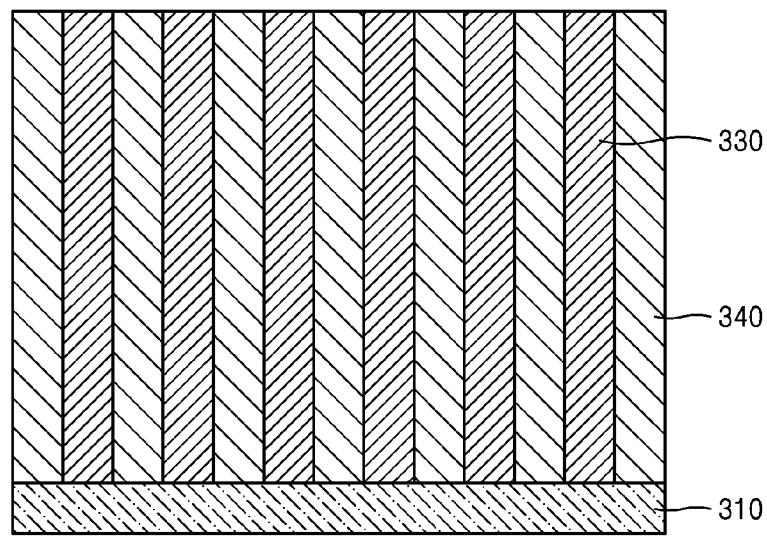

Next, referring to FIG. 11E, a nano-waveguide layer may be completed by filling spaces (331 in FIG. 11D) between the plurality of nano-waveguides 330 with a protecting material 340. The protecting material 340 may include, for example, a polymer with the refractive index less than about 1.99 or a composite of the polymer and carbon nanotube (CNT). For example, the polymer may include at least one material selected from PC, PMMA, Si rubber, PET, epoxy, and acryl.

The nano-waveguide 330 manufactured by using methods described above may be the scintillation layer (140 in FIG. 1) of the radiation detector 100 described with reference to FIGS. 1 through 5, or the photoconductor layer 240 of the radiation detector 200 described with reference to FIGS. 6 and 7. The nano-waveguide 330 may be separated from the substrate 310 and attached to the photo detector (110 in FIG. 1) or the detector (220 in FIG. 6). In another case, the nano-waveguide 141 maybe attached to the photo detector (110 in FIG. 1) or the detector (220 in FIG. 6) without removing the substrate 310.

Figure 12:
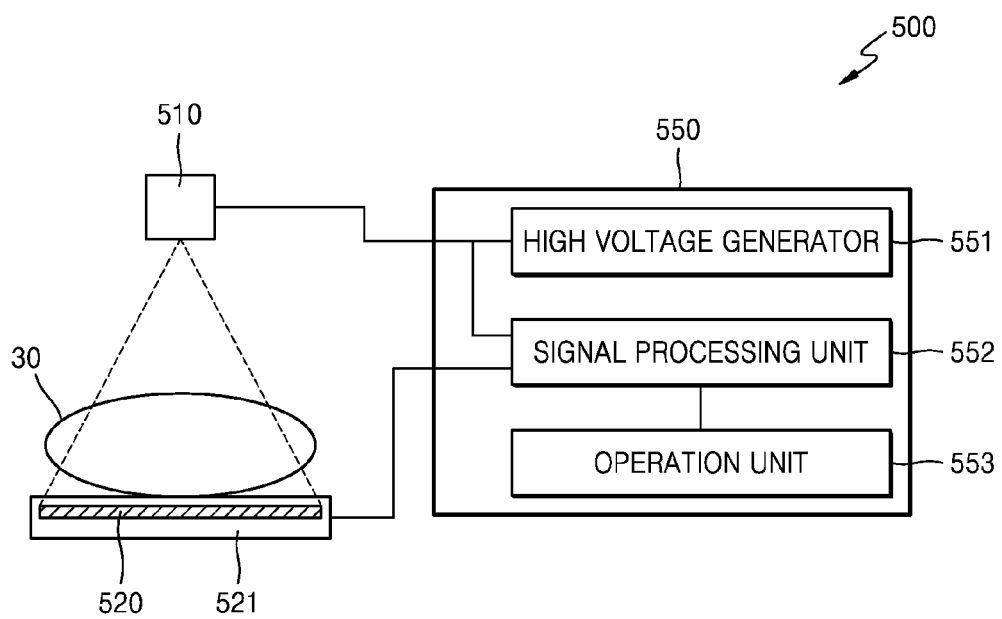
FIG. 12 is a schematic diagram illustrating a radiographic apparatus according to an example embodiment.

FIG. 12 is a schematic diagram illustrating a radiographic apparatus 500 according to another example embodiment. The radiographic apparatus 500 may be stationary or mobile.

Referring to FIG. 12, the radiographic apparatus 500 may include an irradiator 510, a radiation detection unit 520, and a control unit (or, alternatively, a controller) 550 for controlling the irradiator 510 and the radiation detection unit 520.

The radiation irradiator 510 may include a radiation source (not illustrated) for generating radiation and a collimator (not illustrated) collimating paths of generated radiation and controlling an irradiation range of radiation. The radiation source may include, for example, an X-ray tube, and the X-ray tube may a 2-pole vacuum tube including an anode and a cathode. A voltage applied to the cathode and the anode of the X-ray tube may be a tube voltage, and its magnitude may be referred to as a peak value (kVp). As the tube voltage increases, a speed of a thermal electron may increase and as a result, an energy of the X-ray (photon energy) generated by collision at a target substance may increase. A current flowing through the X-ray tube is referred to as a tube current and its magnitude may be denoted as a mean value in mA. As the tube current increases, the number of thermal electrons emitted from a filament may increase and as a result, the X-ray dose (the number of X-ray photons) generated by collision with the target substance may increase. Accordingly, the energy of the X-ray may be controlled via the tube voltage and an intensity of the X-ray or the X-ray dose may be controlled via the tube current and an X-ray exposure time.

The radiation detector 520 may detect radiation rays irradiated from the radiation irradiator 510 and penetrating an object, and may include a flat-plate type radiation detector. The radiation detector 521 may be the radiation detector 100 or 200 described with reference to FIGS. 1 through 10. The radiation detector 520 is illustrated as being included in the radiographic apparatus 500 in FIG. 12. However, the radiation detector 520 may be a separate apparatus which can be attached to and separated from the radiographic apparatus 500.

The control unit 550 may include a high voltage generator 551, a signal processing unit (or, alternatively, a signal processor) 552, and an operation unit 553, and may control an overall operation of the radiographic apparatus 500. The high voltage generator 551 may generate a high voltage for radiation generation and apply the high voltage to the radiation source in the radiation irradiator 510.

The signal processing unit 552 may include at least one processor.

The processor may be implemented by at least one semiconductor chip disposed on a printed circuit board. The processor may be an arithmetic logic unit, a digital signal processor, a microcomputer, a field programmable array, a programmable logic unit, a microprocessor or any other device capable of responding to and executing instructions in a defined manner.

The processor may be programmed with instructions that configure the processor into a special purpose computer to process the signal generated by the radiation detector 520.

For example, the signal processing unit 552 may process information detected in the radiation detection unit 520, generate radiation images or generate a control signal based on information inputted to the operation unit 553, and control various components of the radiographic apparatus 500.

The operation unit 553 may provide an interface for controlling the radiographic apparatus 500 and receive from a user commands for operating the radiographic apparatus 500 and various information about radiography.

The radiographic apparatus 500 may further include an output unit (or, alternatively, a display) (not illustrated) showing radiography-related information such as irradiation or displaying radiation images generated in the signal processing unit 552. In addition, the radiographic apparatus 500 may be connected to a work station and may process information detected in the radiation detection unit 520 to perform radiography or various components of the radiographic apparatus 500 be controlled via the work station.

It should be understood that the example embodiments described herein should be considered in a descriptive sense only and not for purposes of limitation. Descriptions of the features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A radiation detector comprising:
   a scintillator configured to generate scintillation, the scintillator including,
      a plurality of nano-waveguides extending from an incident end of the scintillator to an exit end of the scintillator, the plurality of nano-waveguides configured to generate the scintillation as radiation rays penetrate therethrough, and
      a protecting material surrounding each of the plurality of nano-waveguides; and
   a photo detector configured to detect the scintillation emitted from the scintillator.

2. The radiation detector of claim 1, wherein the plurality of nano-waveguides are one of a nanowire and a nanorod.

3. The radiation detector of claim 2, wherein the plurality of nano-waveguides each have a shape of one of a cylinder and a square column.

4. The radiation detector of claim 2, wherein the plurality of nano-waveguides each have a diameter of about 100 nanometers (nm) to 1000 nm.

5. The radiation detector of claim 2, wherein the plurality of nano-waveguides each have a length of about 100 micrometers (μm) to about 1000 μm.

6. The radiation detector of claim 1, wherein the plurality of nano-waveguides each include a material having a refractive index of about 2 to about 4 in a visible light range.

7. The radiation detector of claim 1, wherein the plurality of nano-waveguides each include a perovskite including lead (Pb).

8. The radiation detector of claim 7, wherein, the perovskite is denoted as $ABX_3$, where A or B is Pb, and X is at least one of iodine (I) and bromine (Br).

9. The radiation detector of claim 1, wherein the plurality of nano-waveguides each include at least one of Lead Iodine ($PbI_2$), Mercury Iodine ($HgI_2$), Lead Oxide (PbO), Cadmium zinc telluride (CdZnTe), and Cadmium telluride (CdTe).

10. The radiation detector of claim 1, wherein the protecting material is water-proof.

11. The radiation detector of claim 1, wherein the protecting material includes one of a polymer having a refractive index less than about 1.99 and a composite of the polymer and a carbon nanotube (CNT).

12. The radiation detector of claim 11, wherein the polymer includes at least one of Polycarbonates (PC), Polymethyl methacrylate (PMMA), Si rubber, Polyethylene terephthalate (PET), epoxy, and acryl.

13. The radiation detector of claim 1, further comprising:
    a protecting layer configured to cover the incident end of the scintillator.

14. The radiation detector of claim 13, wherein the protecting layer includes a polymer with a refractive index less than about 1.99 or glass.

15. The radiation detector of claim 1, wherein the radiation rays are X-rays.

16. A radiation detector comprising:
    a photoconductor configured to perform photo-electric conversion to convert radiation rays into an electric charge, the photoconductor including,
       a plurality of nano-waveguides extending from an incident end of the photoconductor to an exit end of the photoconductor, the plurality of nano-waveguides configured to guide the radiation rays, and
       a protecting material surrounding each of the plurality of nano-waveguides; and
    a photo detector configured to detect the electric charge generated via the photo-electric conversion in the photoconductor.

17. The radiation detector of claim 16, further comprising:
    a protecting layer configured to cover the incident end of the photoconductor.

18. The radiation detector of claim 17, wherein the protecting layer includes a metal thin film.

19. The radiation detector of claim 18, wherein the protecting layer further comprises:
    a composite layer of polymer and carbon nanotube (CNT) on the metal thin film.

20. A radiography apparatus comprising:
    an irradiator configured to emit radiation therefrom;
    a radiation detector configured to detect the radiation emitted from the irradiator, the radiation detector including,
       a scintillator configured to generate scintillation, the scintillator including a plurality of nano-waveguides and a protecting material surrounding each of the plurality of nano-waveguides, the plurality of nano-waveguides extending from an incident end of the scintillator to an exit end of the scintillator, the plurality of nano-waveguides configured to generate the scintillation as radiation rays penetrate therethrough, and
       a photo detector configured to detect the scintillation emitted from the scintillator; and
    a controller configured to control the irradiator and the radiation detector.

* * * * *